(12) United States Patent
Takayama et al.

(10) Patent No.: US 7,704,428 B2
(45) Date of Patent: *Apr. 27, 2010

(54) METHOD FOR MANUFACTURING DIAPHRAGM FOR USE IN ELECTROACOUSTIC TRANSDUCER

(75) Inventors: Koji Takayama, Yamagata (JP);
Masatoshi Sato, Yamagata (JP);
Shinichi Hayasaka, Yamagata (JP);
Hiroyuki Kobayashi, Yamagata (JP)

(73) Assignees: Pioneer Corporation, Tokyo (JP);
Tohoku Pioneer Electronic Corporation, Yamagata (JP)

( * ) Notice: Subject to any disclaimer, the term of this patent is extended or adjusted under 35 U.S.C. 154(b) by 544 days.

This patent is subject to a terminal disclaimer.

(21) Appl. No.: 11/114,222

(22) Filed: Apr. 26, 2005

(65) Prior Publication Data

US 2005/0248058 A1    Nov. 10, 2005

(30) Foreign Application Priority Data

Apr. 26, 2004  (JP)  .......................... P2004-130302

(51) Int. Cl.
*B29C 45/14* (2006.01)
(52) U.S. Cl. .................. 264/255; 264/257; 264/266; 264/275; 264/296
(58) Field of Classification Search .................. None
See application file for complete search history.

(56) References Cited

U.S. PATENT DOCUMENTS 6,183,674 B1 *  2/2001  Nonogaki ................. 264/46.4

FOREIGN PATENT DOCUMENTS

| JP | 49-19817 | | 2/1974 |
|----|----------|---|--------|
| JP | 55096793 | * | 7/1980 |
| JP | 01195011 | * | 8/1989 |
| JP | 01200900 | * | 8/1989 |
| JP | 01-270491 | * | 10/1989 |
| JP | 04362900 | * | 12/1992 |
| JP | 07015793 | * | 1/1995 |
| JP | 07312798 | * | 11/1995 |
| JP | 8-116588 A | | 5/1996 |
| JP | 2000-004496 A | | 1/2000 |
| JP | 2001189998 | * | 7/2001 |

OTHER PUBLICATIONS

Japanese Office Action dated Feb. 17, 2009.

* cited by examiner

*Primary Examiner*—Edmund H. Lee
(74) *Attorney, Agent, or Firm*—Sughrue Mion, PLLC

(57) ABSTRACT

A method for manufacturing a diaphragm for use in an electroacoustic transducer in a multi-layer structure which includes a first diaphragm layer of synthetic resin molded in a predetermined shape by injection molding and a second diaphragm layer layered in intimate contact on the first diaphragm layer and made of substance different from the first diaphragm layer, includes executing successively a pre-molding step and an injection-molding step, thereby providing the multi-layer structure. The pre-molding step includes attaching a non-molded sheet-like material which is a raw material of the second diaphragm layer to a mating surface of one of the die part of an injection molding die, and closing thereafter the injection molding die to give the sheet-like material a predetermined diaphragm shape. The injection molding step includes injecting synthetic resin material constituting the first diaphragm layer into the injection molding die thus closed thereby to form the first diaphragm layer.

3 Claims, 6 Drawing Sheets

METHOD FOR MANUFACTURING DIAPHRAGM FOR USE IN ELECTROACOUSTIC TRANSDUCER

BACKGROUND OF THE INVENTION

1. Field of the Invention

This invention relates to a method for manufacturing a diaphragm for use in an electroacoustic transducer (hereinafter also referred to as an electroacoustic-transducer-use), and more particularly to a method for manufacturing an electroacoustic-tranducer-use diaphragm in a multi-layer structure including a first diaphragm layer of synthetic resin molded in a predetermined shape by injection molding and a second diaphragm layer (skin layer) layered or stacked in intimate contact on the first diaphragm layer and made of a different material from the first diaphragm layer.

2. Description of the Related Art

The physical properties required for the electroacoustic-tranducer-use diaphragm such as a speaker or microphone are large specific modulus $(E/\rho)$ or specific bending modulus $(E/\rho^3)$, suitable internal loss, endurance to mechanical fatigue and good weatherability. Further, in recent years, moisture resistance is also an important property for mainly a vehicle application.

In order to satisfy these demands, as the material for the diaphragm, metal, ceramics, synthetic resin, synthetic fiber, natural cellulose fiber, etc. have been proposed. In recent years, various raw materials such as a microbe cellulose fiber made by biotechnology have been also proposed. The materials thus proposed have been machined by various machining techniques.

However, each raw material has its own property. The raw materials proposed have merits and demerits from the standpoint of view of the physical property of the diaphragm. Therefore it is actually difficult to cause the diaphragm formed of a single material to exhibit many physical properties required as the diaphragm in good balance.

For example, "paper diaphragm" using the cellulose fiber such as wooden pulp as the raw material is relatively light in weight, and has an appropriate elasticity and internal loss. The paper diaphragm presented merits of being manufactured by various techniques and of high freedom of design, but presented demerits of difficulty of assuring the waterproof and of providing high elasticity to ensure high input endurance.

On the other hand, the synthetic-resin diaphragm or metallic diaphragm has merits of easiness of assuring the waterproof and of providing the high elasticity to ensure high input endurance, but demerits of a high density and small internal loss. Therefore, the synthetic-resin diaphragm and metallic diaphragm are not optimum as the diaphragm for a low-to-midi range or all bands which requires light weight and high rigidity.

In view of the above circumstances, it has been proposed to provide the diaphragm with a good balance in the physical properties by adopting a multi-layer structure consisting of a plurality of raw materials with different physical properties to compensate for the demerits of the individual raw materials.

FIG. 1 shows an example of such a diaphragm for use in an electroacoustic transducer.

An electroacoustic-transducer-use diaphragm 1 illustrated herein has a double layer structure consisting of a first diaphragm layer 3 made of synthetic resin molded in a predetermined shape by injection molding and a second diaphragm layer (skin layer) 5 layered in intimate contact on the first diaphragm layer 3 and made of a different material from the first diaphragm layer 3.

By compensating for the demerit of e.g. woven cloth of aramid fiber used as a raw material of the second diaphragm layer 5 by the characteristic of the resin layer, the diaphragm having various physical properties in good balance can be obtained.

Meanwhile, as a method for manufacturing such an electroacoustic-transducer-use diaphragm in a multi-layer structure, there has been proposed a method in which after the first diaphragm layer 3 and the second diaphragm layer 5 have been individually made, both layers are integrated using e.g. adhesive as required or another method in which with the second diaphragm layer 5 having been previously molded in a predetermined size/shape by a separate press molding machine, the second diaphragm layer 5 thus molded is insert-molded in molding the first diaphragm layer 3 so that it is integrated to the first diaphragm layer 3 (e.g. see JP-A-2000-4496).

However, the above conventional method has a problem that the number of manufacturing steps is increased because of the step of independently molding the second diaphragm layer 5, thus increasing the production cost.

Further, when the second diaphragm layer 5 molded is set in a die for injection-molding the first diaphragm layer 3 (hereinafter referred to as an injection-molding die), or when the first diaphragm layer 3 and the second diaphragm layer 5 which have been individually made are stacked, it was difficult to provide uniform contact over the entire region of a stacking plane because of a fine size error therebetween and was impossible to ensure a uniform physical property over the entire region of the diaphragm, thus giving possibility of occurrence of changes in the acoustic characteristic.

The problems that this invention intends to solve are the problems involved in the above conventional technique, for example, a problem of an increase in cost due to the increase in the number of manufacturing steps and a problem of partial fluctuation in intimate contact due to a size error between the first diaphragm layer and the second diaphragm layer, thus leading to a fluctuating vibrating characteristic.

SUMMARY OF THE INVENTION

According to an aspect of the present invention, a method for manufacturing an electroacoustic-transducer-use diaphragm in a multi-layer structure which includes a first diaphragm layer of synthetic resin molded in a predetermined shape by injection molding and a second diaphragm layer layered in intimate contact on the first diaphragm layer and made of substance different from that of the first diaphragm layer, the method includes executing successively a pre-molding step and an injection-molding step, thereby providing the multi-layer structure in which the second diaphragm layer is layered in intimate contact on the first diaphragm layer. The pre-molding step includes attaching a non-molded sheet-like material which is a raw material of the second diaphragm layer to a mating surface of one of the die part of an injection molding die, and closing thereafter the injection molding die to give the sheet-like material a predetermined diaphragm shape. The injection molding step includes injecting synthetic resin material constituting the first diaphragm layer into the injection molding die closed thereby to form the first diaphragm layer.

DETAILED DESCRIPTION OF THE INVENTION

Figure 1:
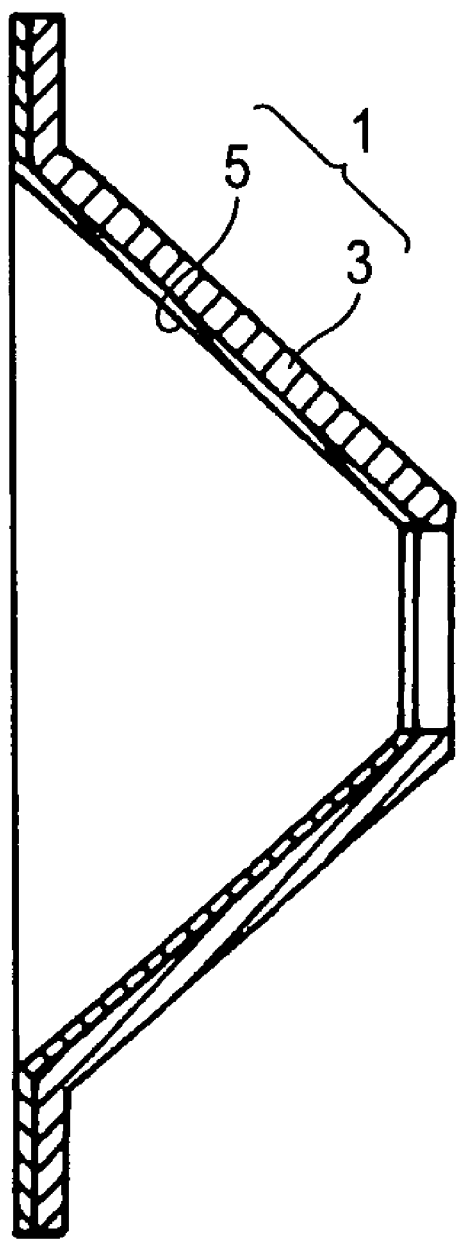
FIG. 1 is a longitudinal sectional view showing an electroacoustic-transducer-use diaphragm in a multi-layer layer structure.

Now referring to the drawings, a detailed explanation will be given of various preferred embodiments of a method for manufacturing an electroacoustic-transducer-use diaphragm according to this invention.

Figure 2:
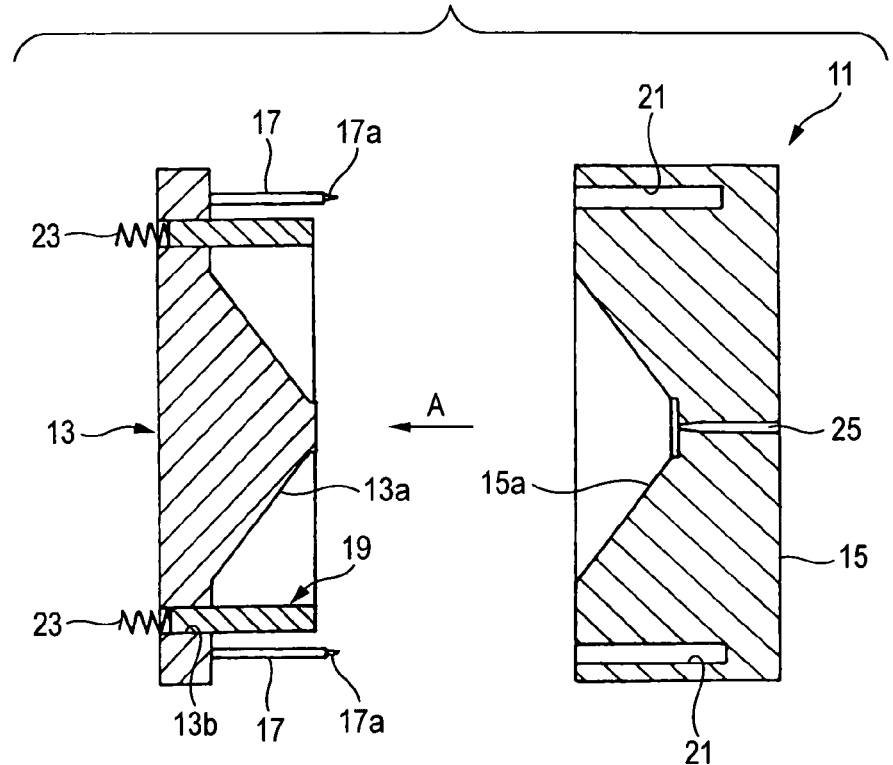
FIG. 2 is a longitudinal sectional view when an injection molding die is opened which is used in an embodiment of a method for manufacturing an electroacoustic-transducer-use diaphragm according to this invention.
Figure 3:
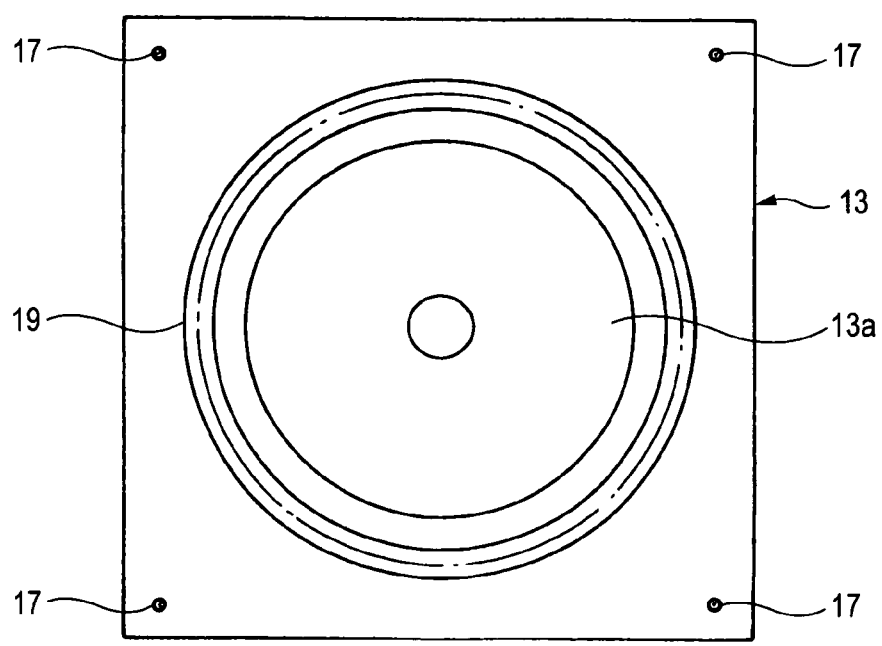
FIG. 3 is a view when viewed in arrow A in FIG. 2.

FIGS. 2 and 3 show an injection-molding die used in an embodiment of a method for manufacturing an electroacoustic-transducer-use diaphragm according to this invention.

An injection-molding die 11 is used for manufacturing the diaphragm 1 shown in FIG. 1. The injection-molding die 11 consists of a male die part (also simply referred to as a male die) 13 having a cone-shaped projection 13a formed along the contour of the surface of the diaphragm 1 and a female die part (also simply referred to as a female die) 15 having a cone-shaped concavity 15a corresponding to the cone-shaped projection 13a.

One of the male die 13 and the female die 15 is movably supported by a guide member not shown so that the injection molding die 11 can be opened/closed.

In this embodiment, the male die 13 is provided with four sheet positioning pins 17 having tip needles 17a penetrating the outer edge of a sheet-like material (described later) to secure it and a sheet pressing-down unit 19 to press the surface of the sheet-like material positioned by the sheet positioning pins 17 to prevent wrinkles from occurring in the sheet-like material.

The sheet positioning pins 17, as seen from FIG. 3, are provided vertically upright at four corners of the mating surface of the male die 13 opposite to the female die 15.

During die closing, in order that these sheet positioning pins 17 do not interfere with the female die 15, relief holes 21 which these sheet positioning pins 17 pass, respectively are provided in the mating surface of the female die 15.

As seen from FIG. 3, the sheet pressing-down unit 19, which is cylindrical with its center axis aligning with that of the cone-shaped projection 13a, is supported by a guiding hole 13b formed in the male die 13 so that it is slidable toward the female die 15 and also urged toward the female die 15 by a urging unit (spring) 23 arranged at its rear of the male die 13.

The male die 13 has a gate 25 penetrating at its center, which is used for injecting synthetic resin.

Next, an explanation will be given of the procedure of manufacturing the diaphragm 1 shown in FIG. 1 using the injection-molding die 11 described above.

Figure 4:
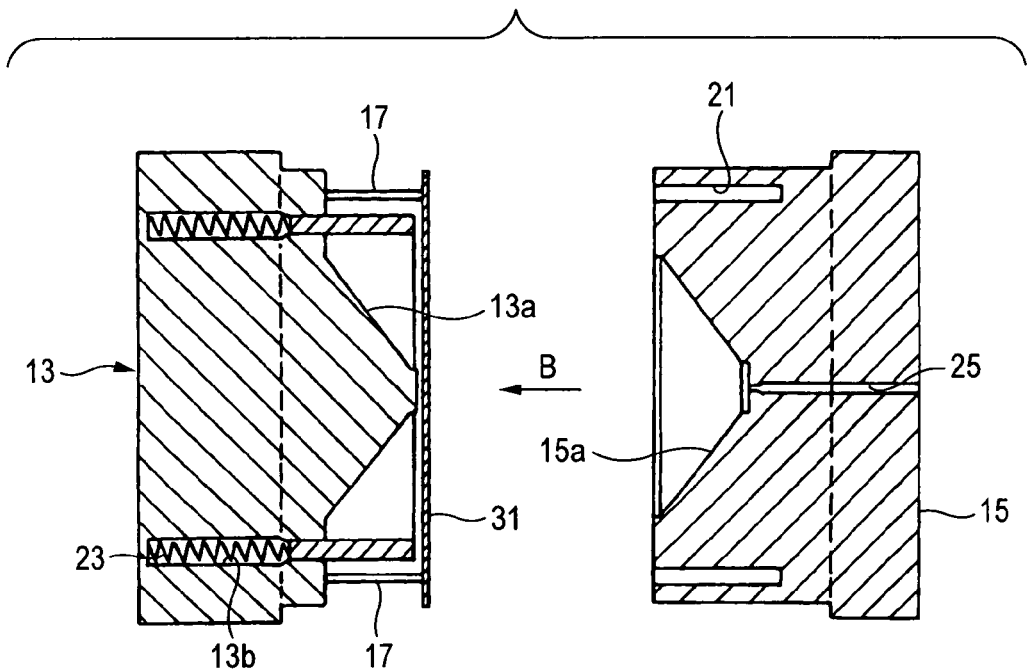
FIG. 4 is a view for explaining the state where a non-molded sheet-like material which is a raw material of the second diaphragm layer is attached to one part of an injection molding die shown in FIG. 2.
Figure 5:
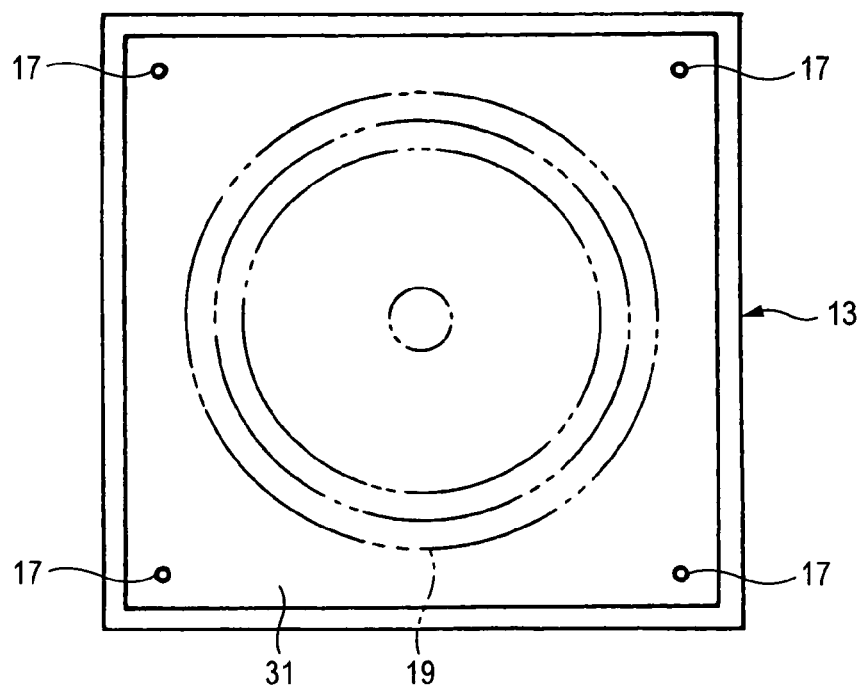
FIG. 5 is a view when viewed in arrow B in FIG. 4.

First, as seen from FIG. 4, with the respective die parts 13, 15 having been moved to open the injection-molding die 11, a non-molded sheet-like material 31, which is the raw material of the second diaphragm layer, is attached to the sheet positioning pins 17 of the one die part 13.

Next, a pre-molding step will be executed. In the pre-molding step, as seen from FIG. 6, by closing the injection-molding die 11, the sheet-like material 31 is sandwiched by the cone-shaped projection 13a and the cone-shaped concavity 15a. Thus, the sheet-like material 31 is given a nearly predetermined diaphragm shape.

In an injection molding step to be executed subsequently, from the gate 25 of the male die 15, a synthetic resin material 26 which serves as the first diaphragm layer 3 is injected into the injection molding die 11 at predetermined temperature and pressure, thereby making the first diaphragm layer 3. The sheet-like material 31 thus provisionally molded is given a predetermined diaphragm shape corresponding to a die shape by resin pressure of injection.

Figure 6:
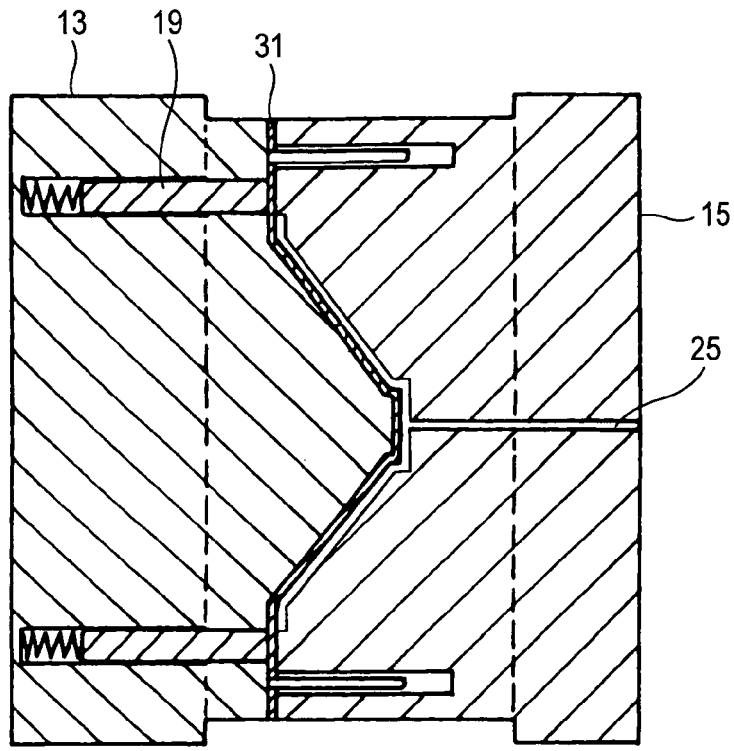
FIG. 6 is a sectional view showing the step of molding the non-molded sheet-like material in a predetermined shape in an embodiment of this invention.
Figure 7:
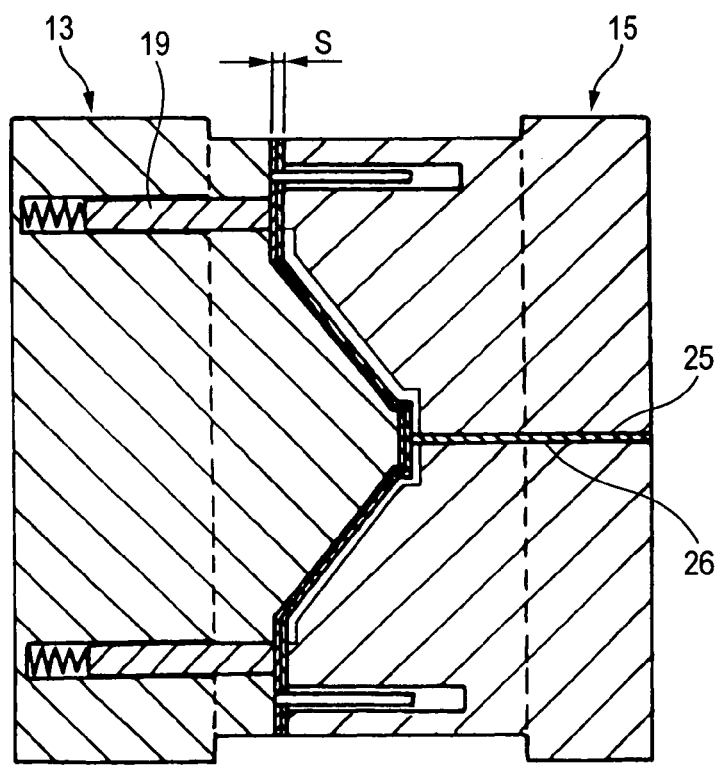
FIG. 7 is a sectional view showing the state where the synthetic resin material 26 constituting the first diaphragm layer is being injected into an injection molding die in an embodiment of this invention.

Incidentally, in order to facilitate resin flow during the injection molding step, a die gap S necessary to inject the synthetic resin material which is the first diaphragm layer 3 may be formed by moving the one die part, as shown in FIG. 7 from the die-closed state shown in FIG. 6 by a predetermined distance in a direction in which both die parts leave each other. With the die gap S being formed, the injection molding step is executed.

Figure 8:
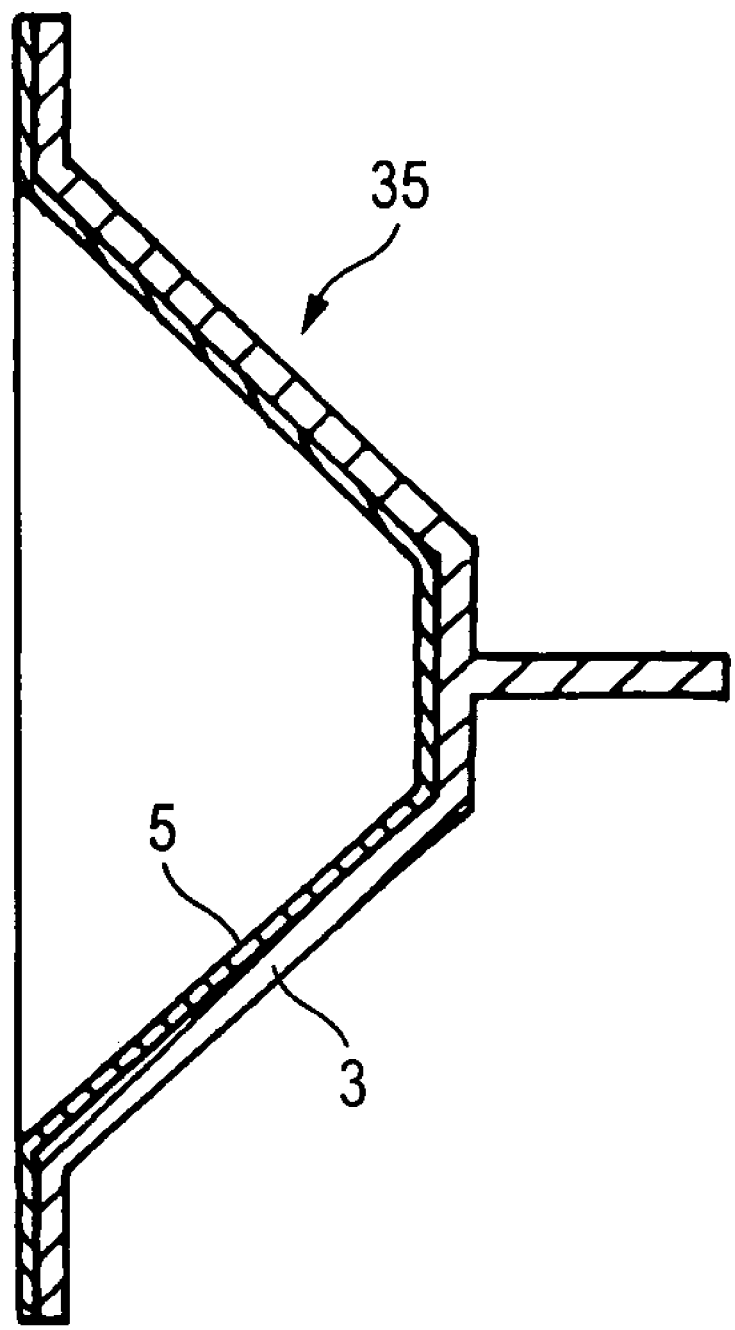
FIG. 8 is a longitudinal sectional view of a molded product manufactured by the injection molding step shown in FIG. 7.

FIG. 8 shows a molded product 35 taken out by opening the injection molding die 11 after the injection molding step has been completed.

Unnecessary part (e.g. gate traces) is cut from the molded product 35, thereby providing a diaphragm 1 in a multi-layer structure in which the second diaphragm layer 5 is layered in intimate contact on the first diaphragm layer 3, as shown in FIG. 1.

Incidentally, the main component of the sheet-like material 31 may be, for example, woven cloth of aramid fiber.

The synthetic resin material which constitutes the first diaphragm layer 3 may be, for example, a mixture of a base of olefin resin such as polypropylene with filler such as mica or carbon fiber.

As understood from the detailed description hitherto made, the method for manufacturing a diaphragm for use in an electronacoustic transducer according to the embodiment of this invention is a method for manufacturing a diaphragm for use in an electroacoustic transducer in a multi-layer structure which includes a first diaphragm layer 3 of synthetic resin molded in a predetermined shape by injection molding and a second diaphragm layer 5 layered in intimate contact on the first diaphragm layer and made of substance different from that of the first diaphragm layer 3, the method including executing successively a pre-molding step and an injection-molding step, thereby providing the multi-layer structure in which the second diaphragm layer 5 is layered in intimate contact on the first diaphragm layer 3. The pre-molding step includes attaching a non-molded sheet-like material which is a raw material of the second diaphragm layer 5 to a molding face of one of the die part of an injection molding die, and closing thereafter the injection molding die to give the sheet-like material a predetermined diaphragm shape. The injection molding step includes injecting synthetic resin material constituting the first diaphragm layer 3 into the injection molding die thus closed thereby to form the first diaphragm layer 3.

In the method for manufacturing a electroacoustic-transducer-use diaphragm described above, the molding of the second diaphragm layer 5 is not done using a dedicated press-molding device, but done through sandwiching it in the injection molding die 11 for making the first diaphragm layer 3, and the injection molding step for making the first diaphragm layer 3 is done in succession thereto. Thus, as compared with the conventional manufacturing method in which the second diaphragm layer 5 is independently molded in a separate manufacturing line, this invention can reduce the number of manufacturing steps, thus reducing the production cost of the diaphragm 1.

Further, the non-molded sheet-like material 31, after it has been provisionally molded in a predetermined shape by die closing of the injection molding die 11, is accurately press-molded in a cavity shape of the die by resin pressure and heat exerted during the injection molding. For this reason, contact failure due to size error does not occur between the first diaphragm layer 3 and the second diaphragm layer 5.

Accordingly, uniform intimate contact can be obtained over the entire region of the stacking plane between the first diaphragm layer 3 and the second diaphragm layer 5. By equalization of the intimate contact between the diaphragm layers, uniform physical property can be ensured over the entire region of the diaphragm. As a result, multi-layering of different materials can assure the improved physical property with no unevenness over the entire region of the diaphragm, thus stably realizing improvement of the acoustic characteristic.

Further, in the method for manufacturing the electroacoustic-transducer-use diaphragm according to this embodiment, with the sheet-like material 31 attached to the mating side of the one die part 13 being suitably tightened by the sheet positioning pins 17 and the sheet pressing-down unit 19, the die closing can be done with no wrinkle of the sheet-like material 31. This suppresses occurrence of molding failure of the sheet-like material in the pre-molding step, thus permitting the pre-molding step to be smoothly executed Further, in the manufacturing method according to this embodiment, after the die closing for the pre-molding step, the die gap S necessary to inject the synthetic resin 26 is formed by moving the one die part 13 by a predetermined distance in the leaving direction. This permits the sheet-like material 31 to be tightly sandwiched by the mating faces of the die parts 13, 15 during the die closing, thereby improving the moldability of the sheet-like material 31.

Incidentally, in this embodiment described above, the diaphragm 1 having a double-layer structure was made in which the second diaphragm layer 5 is layered on the one side of the first diaphragm layer 3.

Figure 9:
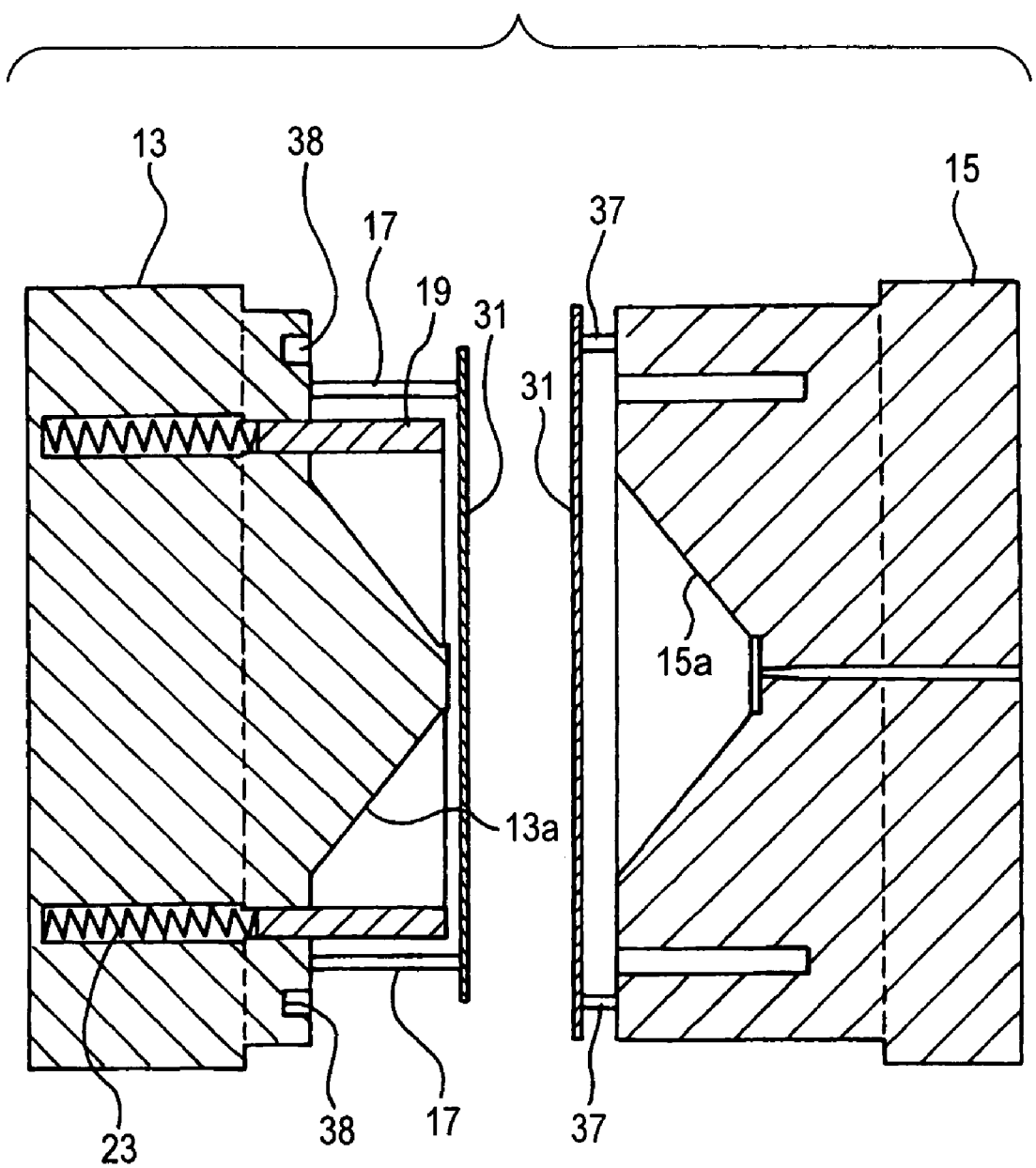
FIG. 9 is a longitudinal sectional view showing the pre-molding step according to another embodiment of the method for manufacturing an electroacoustic-transducer-use according to this invention.

However, as seen from FIG. 9, by executing the pre-molding step with the sheet-like materials 31 being attached to the respective mating surfaces of the male die 13 and female die 15 and the injection molding step described in the above embodiment in succession thereto, the diaphragm in a triple-layer structure can be made in which the second diaphragm layers 5 are layered on both sides of the first diaphragm layer 3.

In this case, if the sheet-like material 31 attached to the male die 13 and that attached to the female die 15 are made of different raw materials, the physical property of the diaphragm 1 of can be further improved.

Incidentally, as seen from FIG. 9, where the diaphragm in a triple-layer structure with the sheet-like raw material 31 attached to the die parts 13, 15, respectively is made, it is desirable that the female die 15 is also provided with sheet positioning pins 37 similar to the sheet positioning pins 17 of the male die 13, and relief holes 38 corresponding to the sheet positioning pins 37 are made in the opposite surface of the male die 13.

In the embodiment described above, the shape of the diaphragm 1 to be manufactured was the cone-shape. But this invention is also applicable to the case where the dome-shaped diaphragm in a multi-layer structure is manufactured.

What is claimed is:

1. A method for manufacturing a diaphragm for use in an electroacoustic transducer in a multi-layer structure which includes a first diaphragm layer of synthetic resin molded in a predetermined shape by injection molding and a second diaphragm layer layered in intimate contact on the first diaphragm layer, the method comprising:

executing successively a pre-molding step and an injection-molding step, thereby providing the multi-layer structure in which the second diaphragm layer is layered on the first diaphragm layer in such a manner that entire surface of the first diaphragm layer and the second diaphragm layer that are opposed to each other are in intimate contact with each other, wherein the pre-molding step includes: attaching the second diaphragm layer to a mating surface of one of die parts of an injection molding die; and closing thereafter the injection molding die to give a sheet material a certain shape corresponding to the predetermined shape; and the injection molding step includes: injecting synthetic resin material constituting the first diaphragm layer into the injection molding die thus closed thereby to form the first diaphragm layer; and forming a die gap necessary to inject the synthetic resin material constituting the first diaphragm layer, before injection of the synthetic resin material by moving either one die part by a predetermined distance in a direction in which both die parts constituting the injection molding die leave each other, wherein one of the die parts to which the second diaphragm layer is attached includes:

a plurality of sheet positioning pins penetrating an outer edge of the sheet material to secure the sheet material during the operation of closing the injection molding die in the pre-molding step; and a sheet pressing-down unit continuously pressing the sheet material positioned by the sheet positioning pins to prevent wrinkles from occurring on the sheet material until the end of the injection molding step.

2. A method for manufacturing a diaphragm for use in an electroacoustic transducer in a multi-layer structure which includes a first diaphragm layer of synthetic resin molded in a predetermined shape by injection molding and a second diaphragm layer layered in intimate contact on the first diaphragm layer, the method comprising:

executing successively a pre-molding step and an injection-molding step, thereby providing the multi-layer structure in which the second diaphragm layer is layered on the first diaphragm layer in such a manner that entire surface of the first diaphragm layer and the second diaphragm layer that are opposed to each other are in intimate contact with each other, wherein the pre-molding step includes: attaching the second diaphragm layer to a mating surface of one of the die part of an injection molding die; and closing thereafter the injection molding die to give the sheet material the same shape as the first diaphragm; and the injection molding step includes: injecting synthetic resin material constituting the first diaphragm layer into the injection molding die thus closed thereby to form the first diaphragm layer; and forming a die gap necessary to inject the synthetic resin material constituting the first diaphragm layer, after the pre-molding step has been completed, by moving either one die part by a predetermined distance in a direction in which both die parts constituting the injection molding die leave each other, wherein a gate for injecting the synthetic resin material into the injection molding die is formed in a vicinity of the center of the first diaphragm;

wherein one of the die parts to which the second diaphragm layer is attached includes:

a plurality of sheet positioning pins penetrating an outer edge of the sheet material to secure the sheet material during the operation of closing the injection molding die in the pre-molding step; and a sheet pressing-down unit continuously pressing the sheet material positioned by the sheet positioning pins to prevent wrinkles from occurring on the sheet material until the end of the injection molding step.

3. The method for manufacturing a diaphragm for use in an electroacoustic transducer according to claim 1, wherein a gate for injecting the synthetic resin material into the injection molding die is formed in a vicinity of the center of the first diaphragm.

* * * * *